United States Patent
White (10) Patent No.: US 11,243,001 B2
(45) Date of Patent: Feb. 8, 2022

(54) COMMON VENTING SYSTEM FOR HEATING, COOLING AND DOMESTIC HOT WATER SYSTEMS

(71) Applicant: 1236220 B.C. LTD, Mission (CA)

(72) Inventor: Keith Richard White, Mission (CA)

(73) Assignee: 1236220 B.C. LTD, Mission (CA)

( * ) Notice: Subject to any disclaimer, the term of this patent is extended or adjusted under 35 U.S.C. 154(b) by 392 days.

(21) Appl. No.: 16/229,913

(22) Filed: Dec. 21, 2018

(65) Prior Publication Data

US 2019/0195514 A1 Jun. 27, 2019

Related U.S. Application Data

(60) Provisional application No. 62/708,804, filed on Dec. 26, 2017.

(51) Int. Cl.
| | |
|---|---|
| *F24F 1/0007* | (2019.01) |
| *F24F 11/77* | (2018.01) |
| *F24F 11/76* | (2018.01) |
| *F24F 1/0041* | (2019.01) |
| *F24F 110/40* | (2018.01) |
| *F24F 7/00* | (2021.01) |

(52) U.S. Cl.
CPC .......... *F24F 1/0007* (2013.01); *F24F 1/0041* (2019.02); *F24F 11/76* (2018.01); *F24F 11/77* (2018.01); *F24F 1/00075* (2019.02); *F24F 2007/001* (2013.01); *F24F 2110/40* (2018.01); *F24F 2221/183* (2013.01); *F24F 2221/34* (2013.01)

(58) Field of Classification Search
CPC .......... F24F 1/0007; F24F 11/77; F24F 11/76; F24F 1/0041; F24F 2110/40; F24F 1/0075; F24F 2007/001; F24F 2221/183
USPC ........................................................ 165/246
See application file for complete search history.

(56) References Cited

U.S. PATENT DOCUMENTS

| | | | | | |
|---|---|---|---|---|---|
| 4,553,696 | A | * | 11/1985 | Ichikawa | F24F 3/0442 236/49.3 |
| 4,890,666 | A | * | 1/1990 | Clark | G05D 23/1917 165/208 |
| 5,076,346 | A | * | 12/1991 | Otsuka | F24F 11/89 165/217 |
| 5,161,608 | A | * | 11/1992 | Osheroff | F24F 3/044 165/208 |
| 5,863,246 | A | * | 1/1999 | Bujak, Jr. | F24F 3/0442 454/255 |

(Continued)

*Primary Examiner* — Tho V Duong
*Assistant Examiner* — Raheena R Malik
(74) *Attorney, Agent, or Firm* — FisherBroyles, LLP (57) ABSTRACT

A common vent application and an independent fan coil are disclosed for improved heating, cooling and water making in a building. The independent fan coil obviates the common boilers and chillers in addition to all the common heating and cooling distribution piping used in known systems. Instead, the fan coils contain all the hydronic heating components and all the components needed to provide AC without the use of common boilers and chilled water systems. The fan coils utilize common vent shaft ducting to exhaust the products of combustion generated for the independent tankless water heater. In addition, the common vent shaft may utilize a negative static pressure environment to exhaust the heat of rejection from the AC portion of the fan coil unit.

12 Claims, 5 Drawing Sheets

(56) References Cited

U.S. PATENT DOCUMENTS

| | | | | | |
|---|---|---|---|---|---|
| 5,979,167 | A | * | 11/1999 | Kochavi | F24F 3/044 62/186 |
| 6,725,914 | B2 | * | 4/2004 | Petterson | F24F 3/0444 165/208 |
| 7,730,935 | B1 | * | 6/2010 | Bujak, Jr. | F24F 3/06 165/208 |
| 8,793,022 | B2 | * | 7/2014 | Uden | F24F 11/76 700/282 |
| 2005/0155365 | A1 | * | 7/2005 | Shah | F24F 3/0442 62/186 |
| 2008/0242218 | A1 | * | 10/2008 | Asano | F24F 1/0007 454/338 |
| 2010/0082162 | A1 | * | 4/2010 | Mundy | F24F 11/70 700/277 |
| 2012/0037714 | A1 | * | 2/2012 | Tsutsumi | F24F 11/74 236/49.3 |

\* cited by examiner

COMMON VENTING SYSTEM FOR HEATING, COOLING AND DOMESTIC HOT WATER SYSTEMS

PRIORITY

This application claims benefit of U.S. Provisional Application No. 62/708,804 filed on Dec. 26, 2017, entitled: MID VELOCITY POSITIVE AND NEGATIVE COMMON VENTING SYSTEM, which is incorporated herein by this reference.

COPYRIGHT NOTICE

© 2017-2018 1026970 BC Ltd., B.C., Canada. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR § 1.71(d).

FIELD OF THE INVENTION

This disclosure pertains to heating, cooling, and hot water systems primarily for installation in residential structures, and more specifically to common venting methods and apparatus for venting exhaust gases in multi-story structures.

BACKGROUND OF THE INVENTION

Historically, low-rise and high-rise apartments have been heated and cooled with common boilers and common chilled water systems. The heating and cooling transfer agents (water, glycol or various refrigerants) are heated with a common boiler and chilled with a common chiller system, and then pumped into a piped common distribution system into a 4-pipe fan coil unit in each independent suite; 2 pipes supply hot water for heating and two pipes supply chilled water for AC. Since the distribution systems extend over several stories, the transfer agent is generally pumped under pressure and or gravity is used to supply the transfer agent from the roof down to the fan coil units in each suite. Since high flow rates are needed to move the transfer agent throughout the structure piping, and the individual suite fan coils require lower transfer agent flow rates to function, balancing valves are required on the supply piping to each fan coil. These systems have been notoriously difficult to balance effectively. The need remains for improvements in heating, cooling and domestic water systems in multi-story structures. Methods and apparatus disclosed herein can be used to improve operation, cost and efficiency of such system.

SUMMARY OF THE INVENTION

The following is a summary of the invention in order to provide a basic understanding of some aspects of the invention. This summary is not intended to identify key/critical elements of the invention or to delineate the scope of the invention. Its sole purpose is to present some concepts of the invention in a simplified form as a prelude to the more detailed description that is presented later.

With a common vent application and an independent fan coil system in each suite as disclosed herein the foregoing problems may be mitigated. The independent fan coil systems obviate all the common boilers and chillers in addition to all the common heating and cooling distribution piping. Instead, the fan coils contain all the hydronic heating components and all the components needed to provide AC without the use of common boilers and chilled water systems. The independent fan coil systems utilize a common vent shaft ducting to exhaust the products of combustion generated for the independent tankless water heaters. In addition, the common vent shaft may utilize a negative static pressure environment to exhaust the heat of rejection from the AC portion of the fan coil unit. In some embodiments, a common vent pipe may be installed in a vertical service shaft rather than using a dedicated common vent shaft.

The common venting system can be used to receive combustion gasses from each individual suite tankless on demand appliance on several levels after which the products of combustion vent to the atmosphere.

In an example, a new system to heat and cool structures without the use of common strata use mechanical systems and has the potential to reduce carbon emissions, greenhouse gases and allow the occupants true autonomous control over their heating and cooling systems.

In an embodiment, a system for installation in a structure comprising plural individual suites may comprise: a common vent shaft arranged to provide air flow from two or more of the suites to the exterior of the structure; and an independent fan coil system installed in one of the suites, the independent fan coil system coupled to the common vent shaft and including: a heating section to receive return air from the suite, warm the return air, and deliver the warmed return air to a plenum; connections coupling the heating section to a source of hydronic heating fluid for said warming the return air; and a cooling section to cool the return air and supply it to the plenum.

In another embodiment, an independent fan coil system comprises:

a controller arranged to receive input signals from a thermostat and generate control signals responsive, at least in part, to the input signals;

a heating section arranged to receive the return air, warm the return air, and deliver the warmed return air to a plenum responsive to control signals generated by the controller;

the heating section including a hydronic coil coupled to receive hydronic heating fluid for said warming the return air; and a cooling section to cool return air and supply it to a plenum; and the cooling section including a heat pump system for removing heat from the return air and or from incoming air from a separate supply air duct.

Additional aspects and advantages of this invention will be apparent from the following detailed description of preferred embodiments, which proceeds with reference to the accompanying drawings.

DETAILED DESCRIPTION OF PREFERRED EMBODIMENTS

Figure 1:
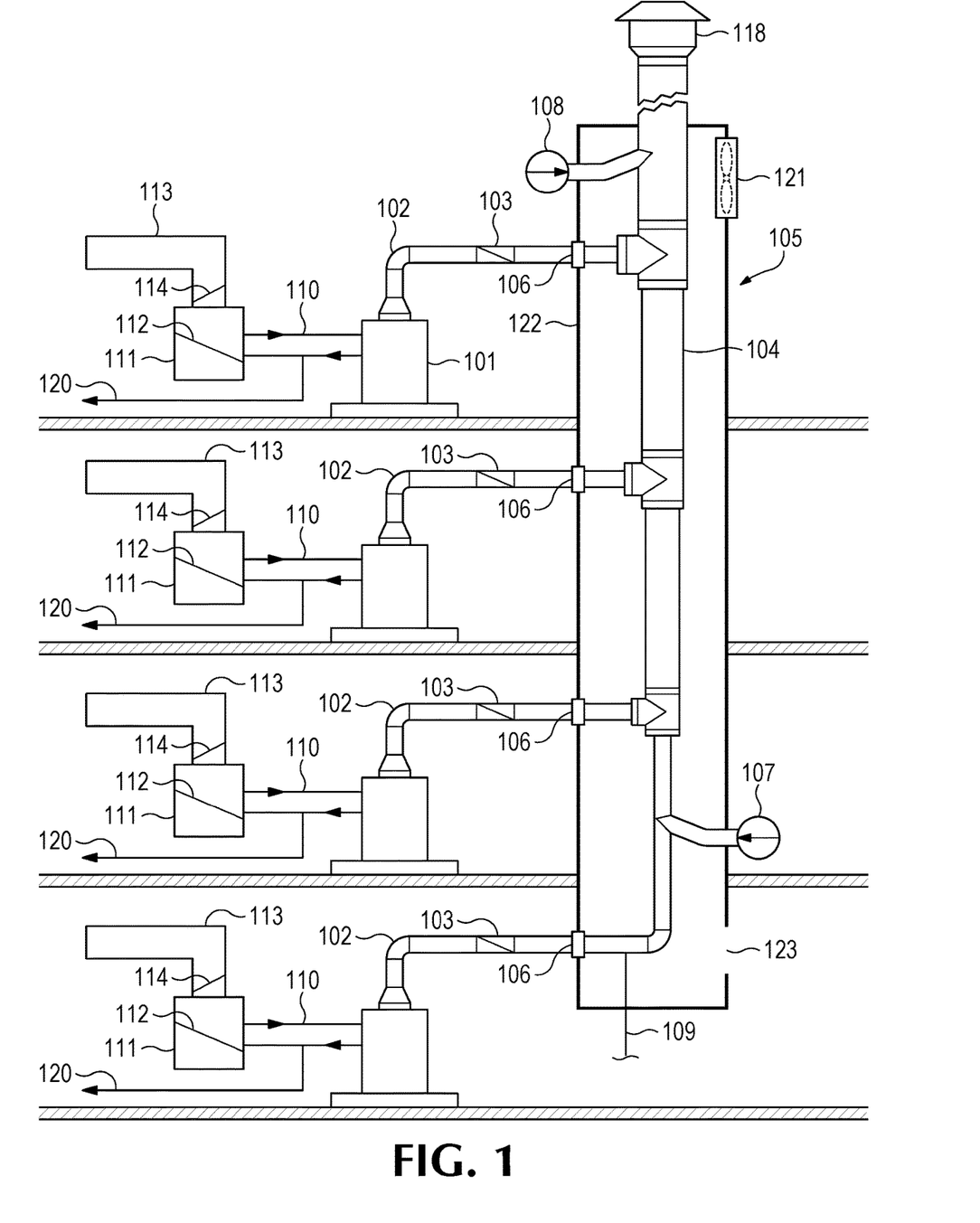
FIG. 1 is a simplified diagram illustrating an example of a common venting system in a structure consistent with the present disclosure.

FIG. 1 is a simplified diagram illustrating an example of a common venting system application consistent with the present disclosure. In FIG. 1, a cross-sectional view is shown comprising four floors or suites in a structure such as a condominium or apartment building, although the structure may be for commercial or residential (or mixed) use. The system may be used with more (or fewer) than four floors; the drawing is merely illustrative. On each floor, a tankless on-demand water heater 101 is installed. Each water heater 101 has an exhaust vent pipe 102 for venting exhaust (combustion) gases, through a corresponding back-draft damper 103, into a common vertical shaft 105 built into the structure.

Figure 3A:
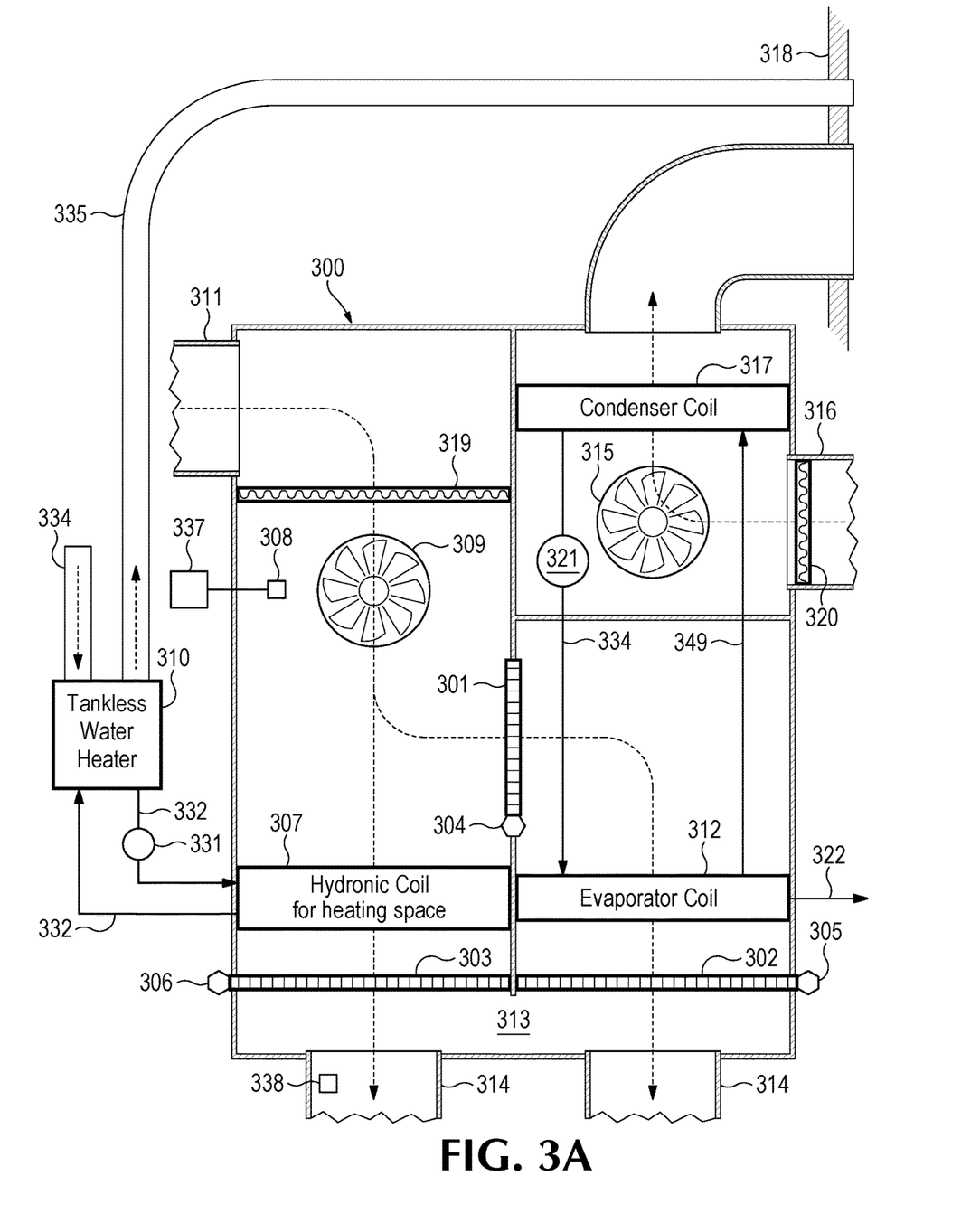
FIG. 3A is a simplified diagram illustrating heating and cooling operations of an independent fan coil system.
Figure 3B:
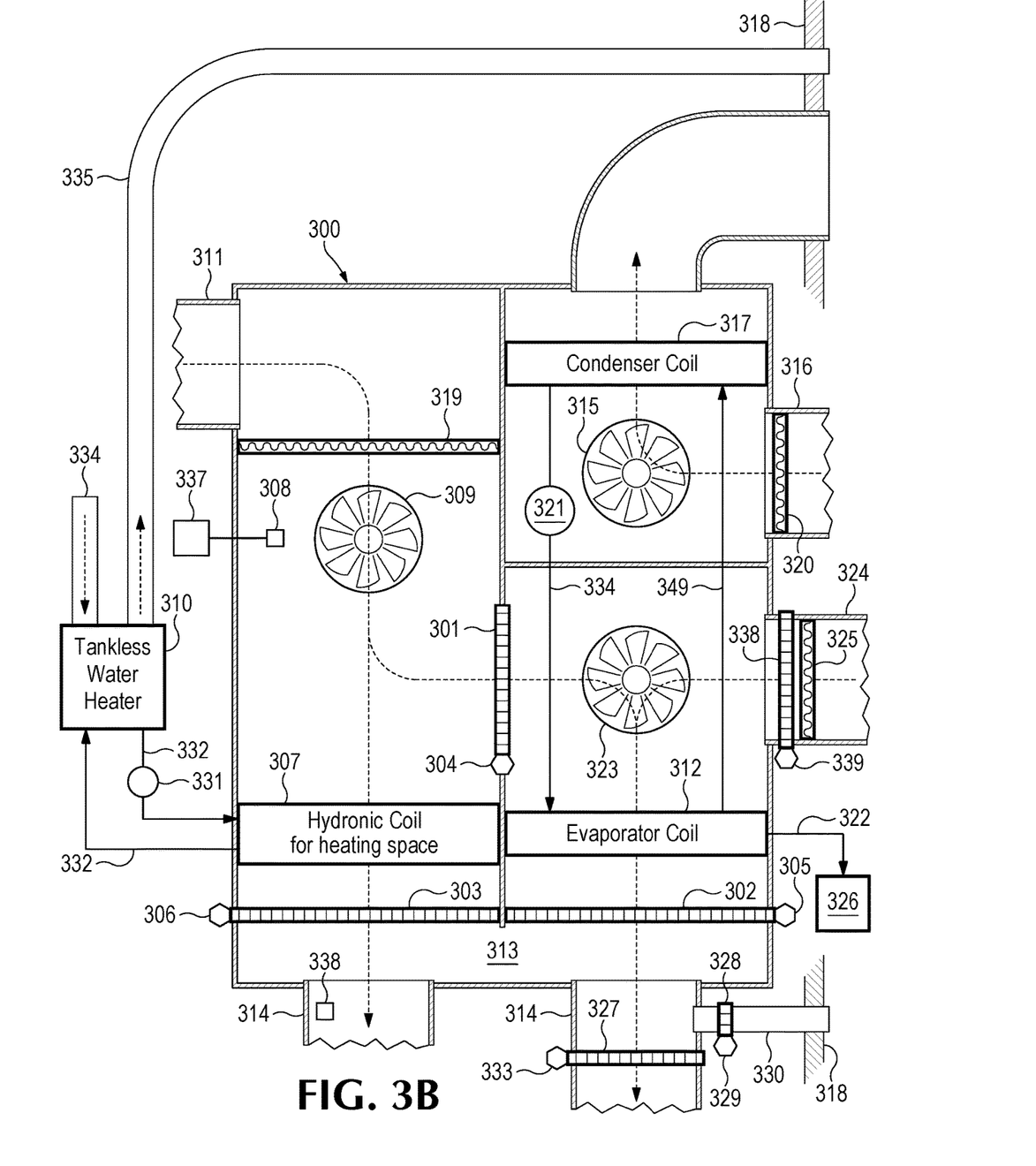
FIG. 3B is a simplified diagram illustrating heating, cooling and water making operations in the independent fan coil system of FIG. 3A.
Figure 3C:
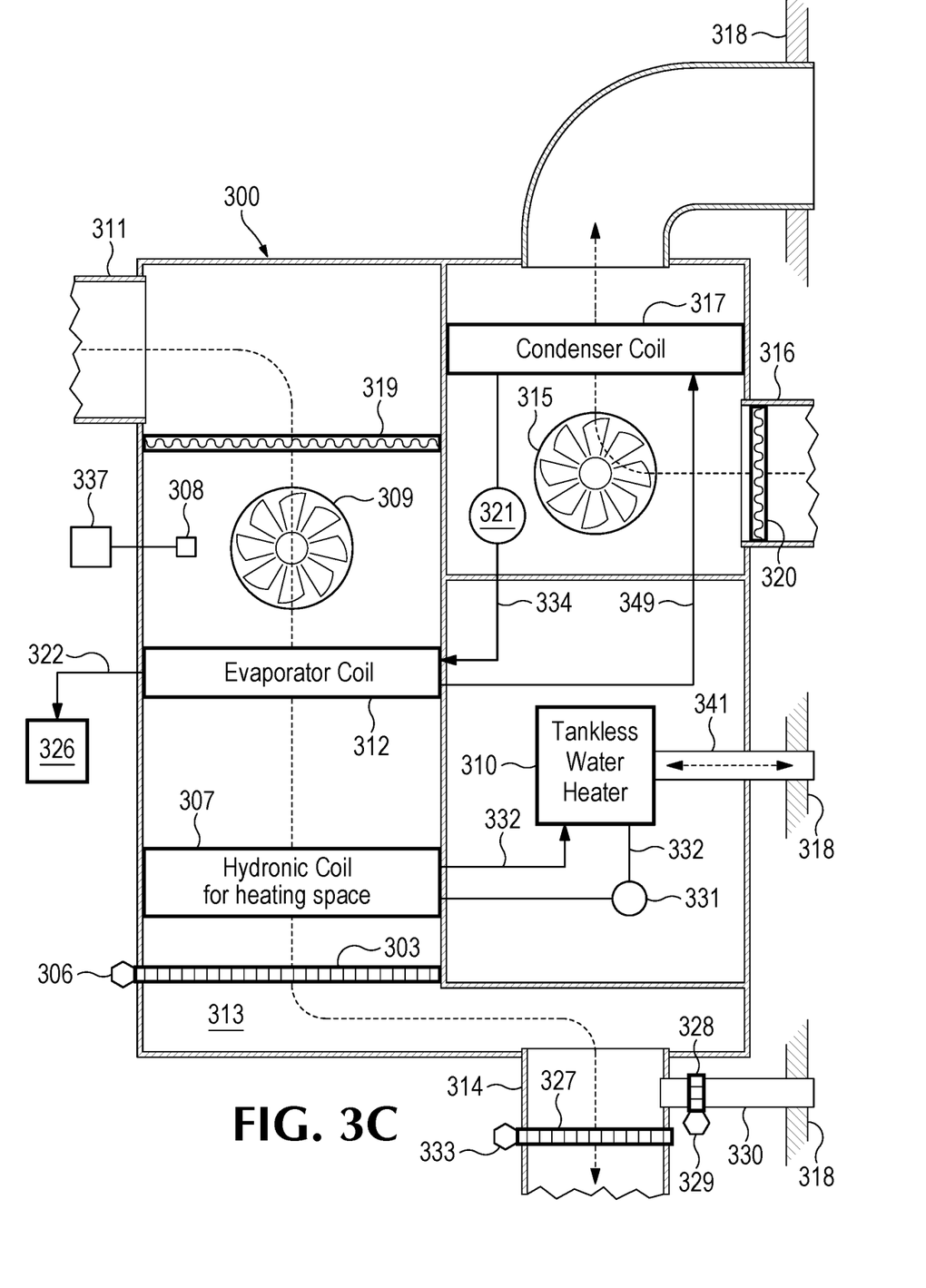
FIG. 3C is a simplified diagram illustrating an alternative embodiment of an independent fan coil system with an internal tankless water heater.

Common vertical shaft may also operate at different static pressure settings, to evacuate the heat of rejection produced from the AC in fan coil unit, see FIGS. 3A, 3B and 3C fan 121 can be located at the top of the common vent shaft 105 to create a negative static pressure. In operation, air enters into the bottom of the shaft by means of a shaft opening 123, and the pressure differential between the air leaving the shaft and the air entering the shaft creates a negative static pressure in the shaft 105. This serves to evacuate the heat rejection at a faster rate, facilitating smaller shaft sizing in the structures.

The exhaust vent pipe penetrates the wall via a fire stop 106 where it enters the shaft. Fire stops should be used consistent with local building codes. The damper is arranged to prevent combustion gases from entering the suite. Inside the shaft, in an embodiment, each of the exhaust vent pipes is connected to a generally vertical, common vent pipe 104. In another embodiment, the shaft may be dedicated for exhaust gas removal without requiring a venting pipe. In another embodiment, more than one common venting pipe may be used. The common shaft may be constructed of wood, concrete, or other rigid materials. Preferably those materials are fire rated to impede the spread of fire from one floor to another.

In an embodiment, the common vent pipe 104 can be configured to operate under a positive pressure at the base of the vent, provided by means of a fan 107. Alternatively, the common vent may be configured to operate under a negative pressure, provided by means of a fan 108 at the top of the common vent where, in operation, the venturi effect draws the exhaust gases from the common vent pipe 104 to exit via a vent cap 118 on the roof to the atmosphere outside of the structure. The negative static pressure can be controlled by a static pressure sensor (not shown) to modulate the pressure inside common vent 104A. A drain 109 may be installed at the base of the common vent 104 to accommodate condensation accumulation in the common vent pipe. Preferably, for most applications, the common vent pipe 104 should also utilize an expansion joint for each exhaust vent pipe 102 to facilitate the expansion and contraction of the vent pipe 104 and negate the strain on exhaust vent pipe 102 when it connects to common vent pipe 104.

In an embodiment, each tankless on-demand water heater 101 receives a supply of cold water (not shown). The water heater within each apartment supplies heated water via piping 110 to an air handler 111 and a heat exchanger 112 within the air handler 111. Warm air via duct 113 is then supplied to each individual apartment; and conversely cold air/air conditioning can be supplied to each individual apartment via a cooling coil 114 and an external condensing unit (not shown) to provide cooling fluid to the cooling coil 114. Warm air via duct 113 also provides suite ventilation. A pipe 120 supplies hot water for domestic use in each suite.

Figure 2:
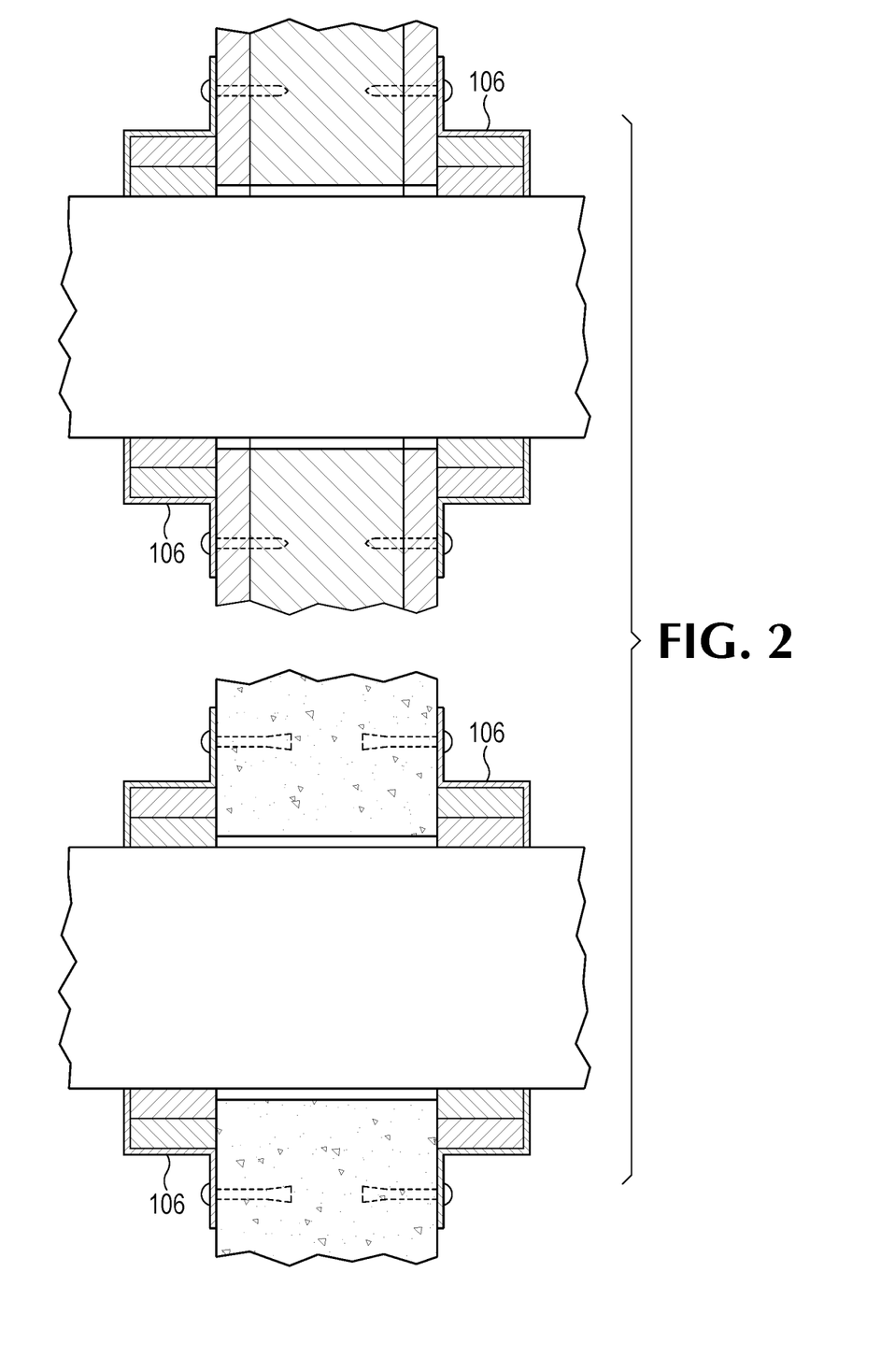
FIG. 2 illustrates in detail the fire stop devices used in FIG. 1.

FIG. 2 illustrates the fire stops 106 of FIG. 1 in detail. Suitable fire stops are commercially available.

Independent Fan Coil System—Call for Space Heating

FIG. 3A is a simplified diagram illustrating, essentially in cross section, the main components and selected operations of an independent fan coil system 300. In FIG. 3A, T-Stat controller 337 sends a call for heat signal to a programmable controller PLC 308. In response, PLC 308 energizes solenoid valve 306 which opens louver 303. Louvers 301, 302 remain closed in heating mode. PLC 308 signals fan blower motor 309 to start, air then enters the independent fan coil system through return air duct 311 and filter 319. PLC 308 then starts tankless water heater 310 and the pump 331 to supply heated heat transfer liquid to a hydronic coil 307 by means of supply and return piping 332. Blower motor 309 forces return air from the suite through coil 307 and louver 303 into plenum 313 and thence into supply air ducts 314 and into the suite for space heating.

Combustion air for the tankless water heater unit 310 enters through piping 334 which can be accessed from the common vent shaft (FIG. 1, 105) or through a vent hood and ducting in the exterior wall of the structure. Combustion gases exiting the water heater unit 310 are conveyed via piping 335 to the common vent shaft of FIG. 1 and into the exhaust ducting pipe (FIG. 1, 104) and vent to atmosphere. The shaft wall 318 corresponds in one embodiment to the wall 122 of FIG. 1. Combustion air and exhaust air piping preferably utilize firestop devices (FIG. 2, 106) to prevent fire from entering the shaft from the suite and prevent a shaft fire from entering the suite. The tankless water heater 310 will supply domestic hot water for showers and washing etc. to the suite (piping not shown) at same time as supplying the transfer liquid via pump 331 to the hydronic coil 307 for space heating. In an embodiment, should the space heating demand and the domestic demand become greater than the heating capacity of the tankless water heater 310, then PLC 308 will disable space heating demand for a selected period, for example, 30 minutes, until the domestic water requirement are satisfied.

In some embodiments, PLC 308 will monitor a static pressure sensor 338 in the supply air ducting 314 to maintain a constant positive static pressure of 0.8 to 1.2. This pressure is measured in External Static Pressure (ESP) units and refers to air pressure differential across the air handler. It refers to the total ESP; thus, in one example, supply air is 0.4 and return air is 0.4 so that ESP is the sum of both or 0.8. This feature allows for substantially smaller supply air duct, giving structural designers more freedom to conceal the supply air ducting, negating the need for unsightly and expensive drop ceilings. PLC 308 will signal blower motor 309 which preferably is a constant torque motor to speed up or slow down to maintain the preset static pressure required in the supply air ducting 314. Alternatively, PLC 308 may monitor blower rpm to maintain constant static pressure by altering rpm to meet setpoint demand.

Principles of Operation FIG. 3A Call for Space Cooling Air Conditioning

T-Stat controller 337 may send a call for cooling signal to PLC 308. In response, PLC 308 energizes solenoid valve 304 which opens a louver 301. PLC 308 also energizes solenoid 305 which opens louver 302. Louver 303 remains closed in cooling mode. PLC 308 signals fan blower motor 309 to start. Air then enters the independent fan coil system 300 through return air duct 311 and filter 319, and through louver 301, and evaporator coil 312, and through louver 302 into plenum 313 and thence into supply air ducting 314 into the structure to provide air-conditioning.

PLC 308 starts blower motor 315, air enters thru air supply duct 316 and air filter 320, air then flows thru condenser coil 317, the heat of rejection passes thru fire protected wall 318 and then into the common vent shaft (FIG. 1) 105 and vents to atmosphere thru the roof. PLC 308 then starts compressor 32 land refrigerant flows thru refrigerant lines 334 and 349 to complete the heat pump configuration. Compressor 321 preferably is configured in the air stream provided by blower motor 309 to provide additional cooling for the compressor. Compressor 321 can utilize R134a, 410A or a varied to refrigerants for the heat pump circuit; rotary compressors are preferable. PLC 308 will allow the tankless water heater to continue to supply domestic hot water during this mode of operation. Condensate produced by the evaporator coil 312 will be piped to drain 322.

Referring now to FIG. 3B, PLC 308 also starts blower motor 315. Blower 315 draws air into the system through air supply duct 316 and air filter 320. That supply air then flows through condenser coil 317, and the heat of rejection passes through fire protected wall 318 and into the common vent shaft and vents to atmosphere through the roof of the structure (see FIG. 1). PLC 308 then starts compressor 321 and refrigerant flows through refrigerant lines 334 and 349 to complete the heat pump configuration. Compressor 321 is configured in the air stream provided by blower motor 315 to provide additional cooling for the compressor. Compressor 321 can utilize R134a, 410A or various other refrigerants for the heat pump circuit. Rotary compressors are preferable. PLC 308 will allow a tankless water heater to continue to supply domestic hot water during this mode of operation. Condensate produced by the evaporator coil 312 should be piped to drain 322.

Principles of Operation FIG. 3B Heating, Cooling and Water Making

Heating operation is as described with regard to FIG. 3A for space heating.

Cooling Operation & Water Making

Referring again to FIG. 3B, in this operation, PLC 308 receives a signal from water storage tank 326 that drinking water is required. Responsive to control signals from the PLC, louvers 303 and 301 remain closed, solenoid 305 opens louver 302, solenoid 339 opens louver 338, and solenoid 329 operates louver 328 to remain closed. PLC 308 starts blower motor 315, air enters through air supply duct 316 and air filter 320, air then flows through the condenser coil 317, the heat of rejection passes through fire damper 318 and then into the common vent shaft (FIG. 1) 105 and vents to atmosphere through the roof. PLC 308 then starts a compressor 321, and (third) blower fan 323, and refrigerant flows through refrigerant lines 334 & 349 to complete the heat pump configuration. Moist air then enters the independent fan coil system 300 through air duct 324, filter 325 and louver 338. It further moves through evaporator coil 312, through louver 302 into plenum 313, and from the plenum into supply air ducting 314 into the suite or apartment to provide air-conditioning. Water produced by the evaporator coil 312 is piped to water storage thank 326 by drain 322. The evaporator coil 312 should be made of pure copper or coated with a nontoxic coating to produce potable water.

When the water storage tank 326 is full, it sends a signal (not shown; may be wired or wireless) to PLC 308 which, in response, turns off the water making. If T-Stat 337 is signaling for AC during this mode of operation, the controller 308 sends control signals to solenoid 329 so that louver 328 remains closed, and to solenoid 333 so that louver 327 remains open, and AC is provided to the suite while water for drinking is being produced. When T-Stat 337 is not sending a signal to PLC 308 for AC, once again responsive to control signals from the controller (PLC 308), louver 327 closes, louver 328 opens and excess cold air is vented to the common vent shaft through ducting 330. If T-Stat 337 calls for space heating during water making mode, then PLC 308 overrides water making until space heating demand is satisfied, louver 328 is closed and louver 327 remains open.

Principles of Operation FIG. 3C Heating/AC/Domestic Water/Water Making

In this alternative configuration, an independent fan coil system 300 has an internal tankless water heater 310. Here, the tankless water heater 310, the associated pump 331 and supply and return piping 332 are housed in the independent fan coil system. Further, the evaporator 312 is configured in front of hydronic heating coil 307, solenoids 305, 306 and louvers 302, 303 are not required. The compressor 321 is configured to receive air flow from blower motor 315.

FIG. 3C Heating Mode

T-Stat controller 337 sends a call for heat signal to PLC 308, PLC 308 signals fan blower motor 309 to start, air then enters the independent fan coil system through return air duct 311 and through filter 319. PLC then starts the tankless water heater 310 and the pump 331 to supply the heat transfer liquid to hydronic coil 307 by means of supply and return piping 332. Blower motor 309 forces return air from the suite through hydronic coil 307 and louver 303 into plenum 313 and into supply air duct 314 and into the suite for space heating.

Combustion air for the tankless unit 310 enters through piping 335 which can be accessed from the common vent shaft (FIG. 1, 105) or through a vent hood and ducting in the exterior wall of the structure. Combustion gas 335 enters the common vent shaft and into the exhaust ducting (FIG. 1, 104) and vents to atmosphere. Combustion air and exhaust air 335 utilize firestop devices (FIG. 2, 206 for example) to prevent fire from entering the shaft from the suite of a shaft fire from entering the suite. The tankless water heater 310 will supply domestic hot water for showers and washing etc. to the suite at the same time as supplying the transfer liquid to the hydronic coil 307 for space heating. Should the space heating demand and the domestic demand become greater than the heating capacity of the tankless water heater 310, then PLC 308 will disable heating demand for 30 minutes, for example, until the domestic water requirements are satisfied. PLC 308 may monitor a static pressure sensor (338 in FIG. 3B) in the supply air ducting 314 to maintain a constant positive static pressure as described. PLC 308 will signal blower motor 309, which preferably is a constant torque motor, to speed up or slow down based on a pressure indication from the pressure sensor 338 so as to maintain the preset static pressure required in the supply air ducting 314. Conversely, PLC 308 may monitor blower rpm to maintain constant static pressure by altering rpm to meet setpoint demand.

FIG. 3C Cooling Mode

T-Stat controller 337 send a call for cooling signal to PLC 308. PLC 308 signals fan blower motor 309 to start, air then enters the independent fan coil system through return air duct 311 and through filter 319 into plenum 313 and thence via supply air ducting 314 into the structure to provide air-conditioning. PLC 308 starts blower motor 315, air enters through air supply duct 316 and air filter 320, air then flows through condenser coil 317, the heat of rejection passes through fire damper 318 and then into the common vent shaft (FIG. 1) 105 and vents to atmosphere through the roof. PLC 308 then starts compressor 321 and refrigerant flows through refrigerant lines 334 & 349 to complete the heat pump configuration. Compressor 321 is configured in the air stream provided by blower motor 315 to provide additional cooling for the compressor. Compressor 321 can utilize, for example, R134a, 410A or a varied to refrigerants for the heat pump circuit; rotary compressors are preferable. PLC 308 will allow tankless water heater to continue to supply domestic hot water during this mode of operation. Condensate produced by the evaporator coil 312 may be piped to drain 322 to water storage tank 326 (FIG. 3B).

FIG. 3C Water Making Mode

PLC 308 receives a signal from water storage tank 326 that drinking water is required. PLC 308 starts blower motor 315, air enters through air supply duct 316 and air filter 320, air then flows through condenser coil 317, the heat of rejection passes through fire damper 318 and then into the common vent shaft (FIG. 1) 105 and vents to atmosphere through the roof. PLC 308 then starts compressor 321, blower fan 323 (FIG. 3B) and refrigerant flows through refrigerant lines 334 and 349 to complete the heat pump configuration. Moist air enters the independent fan coil system through air duct 311 and filter 319. It further flows through evaporator coil 312, into plenum 313 and via supply air ducting 314 into the structure to provide air-conditioning. Water produced by the evaporator coil 312 is piped to water storage thank 326 by drain 322. When water storage tank is full it sends a signal to PLC 308 which turns off the fan coil. If T Stat 337 is signaling for AC during this mode of operation, louver 328 remains closed under control of solenoid 329, louver 327 remains open, and AC is provided to the suite while water for drinking is being produced.

When T-Stat 337 is not sending a signal to PLC 308 for AC then louver 327 closes louver 328 opens and excess cold air is vented to the common vent shaft through ducting 330. If T-Stat 337 calls for space heating during water making mode then PLC 308 overrides water making until space heating demand is satisfied, louver 328 is closed and louver 327 remains open.

In various configurations, electric tankless water heaters may be used instead of gas fired heaters. Those configurations obviate the need to supply and remove combustion gases. A common shaft may still be used to remove excess heat of rejection.

It will be obvious to those having skill in the art that many changes may be made to the details of the above-described embodiments without departing from the underlying principles of the invention. The scope of the present invention should, therefore, be determined only by the following claims.

Most of the equipment discussed above comprises hardware and associated software. For example, the typical electronic device is likely to include one or more processors and software executable on those processors to carry out the operations described. Above, the PLC 308 may be a software-driven controller. We use the term software herein in its commonly understood sense to refer to programs or routines (subroutines, objects, plug-ins, etc.), as well as data, usable by a machine or processor. As is well known, computer programs generally comprise instructions that are stored in machine-readable or computer-readable storage media. Some embodiments of the present invention may include executable programs or instructions that are stored in machine-readable or computer-readable storage media, such as a digital memory. We do not imply that a "computer" in the conventional sense is required in any particular embodiment. For example, various processors, embedded or otherwise, may be used in equipment such as the components described herein.

Having described and illustrated the principles of the invention in a preferred embodiment thereof, it should be apparent that the invention may be modified in arrangement and detail without departing from such principles. We claim all modifications and variations coming within the spirit and scope of the following claims.

The invention claimed is:

1. A system for installation in a structure comprising plural individual suites, the system comprising:
    a common vent shaft arranged to provide air flow from two or more of the suites to the exterior of the structure; and
    an independent fan coil system installed in at least one of the suites, the independent fan coil system coupled to the common vent shaft and comprising:
        a heating section having a return air inlet to receive return air from the suite via a return air duct, a hydronic coil for space heating to warm the return air, and a first louver controllably enabling delivery of the warmed return air to a plenum for distribution into the suite;
        a first fan blower motor arranged to pull incoming air from the return air duct into the heating section;
        connections coupling the heating section to a source of hydronic heating fluid for warming the return air;
        a first solenoid valve arranged to controllably position the first louver; and
        a cooling section to cool the return air and supply it to the plenum;
        a thermostat controller having a user interface;
        a programmable controller arranged to receive signals from the thermostat controller, the controller including a processor arranged to, in response to a call for heat request signal from the thermostat controller generate control signals to:
        energize the first solenoid valve to open the first louver;
        signal the first fan blower motor to start operation, whereby return air flows through the heating section through the hydronic coil; and
        signal a source of hydronic heating fluid to pump heat transfer liquid to the hydronic coil via the connections, whereby the first fan blower motor forces return air from the suite through the hydronic coil and the first louver into the plenum and into the suite for space heating.

2. The system of claim 1 wherein the source of hydronic heating fluid comprises a tankless water heater coupled to the heating section and coupled to the common vent structure to remove combustion and exhaust gases from the tankless water heater to the exterior of the structure.

3. The system of claim 1 wherein the independent fan coil system includes:
    an air filter arranged to filter the return air incoming from the return air inlet; and
    at least one supply air duct arranged to convey air flow from the plenum into the suite;

wherein the source of hydronic heating fluid comprises a tankless water heater and a pump coupled to the tankless water heater to pump heat transfer liquid to the hydronic coil.

4. The system of claim 3 and further comprising:
exhaust ducting installed inside the common vent shaft;
a first coupling of the tankless water heater to the common vent shaft, or to a vent hood and ducting in the exterior wall of the structure, to receive combustion air for water heating operation;
a second coupling of the tankless water heater to remove combustion air and exhaust air into the exhaust ducting in the common vent shaft so as to vent to the atmosphere outside of the structure;
wherein the second coupling to remove exhaust air includes, at locations where the coupling penetrates a wall, fire stop devices to prevent fire from entering the common vent shaft from the suite or entering the suite from the common vent shaft.

5. The system of claim 3 wherein:
the programmable controller is programmed to, responsive to detecting the space heating demand and domestic water demand together exceeding a heating capacity of the tankless water heater, disabling space heating for a predetermined period.

6. The system of claim 5 wherein:
the programmable controller is further programmed to resume space heating responsive to detecting that the domestic water demand is satisfied.

7. The system of claim 1 including:
a static pressure sensor in the supply air ducting; and wherein:
PLC is programmed to monitor the static pressure sensor in the supply air ducting to maintain a constant preset positive static pressure; and
based on monitoring the static pressure sensor, signal the first blower motor to speed up or slow down as needed to maintain the preset static pressure required in the supply air ducting.

8. The system of claim 7 wherein the first blower motor comprises a constant torque motor.

9. The system of claim 7 wherein the controller is programmed to monitor the first blower motor rpm and alter the blower motor rpm responsive to setpoint demand to maintain the preset positive static pressure.

10. The system of claim 3 and further comprising:
a second louver, arranged to control air flow between the return air duct and a cooling section;
a second solenoid valve coupled to the second louver to controllably position the second louver responsive to control signals from the programmable controller;
an evaporator coil installed in the cooling section to cool air flowing through the evaporator coil;
a third louver, arranged to control air flow between the cooling section and the plenum;
a third solenoid valve arranged to controllably position the third louver responsive to control signals from the programmable controller to provide air conditioning to the suite.

11. The system of claim 10 and further comprising:
a supply duct inlet to receive supply air;
a second air filter arranged to filter the received supply air;
a second fan blower motor arranged to pull air from the supply duct inlet and through second air filter;
and wherein the controller is programmed to, responsive to a call for cooling signal received from the thermostat controller, generate control signals to energize the second solenoid valve to open the second louver and energize the third solenoid valve to open the third louver, and energize the first solenoid valve to close first louver during the cooling mode; and further to
generate control signals to signal the first fan blower motor to start operation, whereby return air flows through the second louver and through the evaporator coil into the plenum for distributing cool air into the suite.

12. The system of claim 10 and further comprising:
a fourth louver arranged to controllably enable air flow from an inlet duct, optionally through an air filter, into the cooling section;
a third fan blower positioned to pull air through the inlet duct and the fourth louver into the cooling section; and wherein the controller is programmed to:
responsive to a call for cooling signal received from the thermostat controller, generate control signals to energize the second solenoid valve to open the second louver and energize the third solenoid to open the third louver, and energize the first solenoid valve to close first louver during the cooling mode; and further to
control the fourth louver to enable air flow from the inlet duct into the cooling section;
activate the third fan blower to pull air from the inlet duct and through the evaporator coil; and
direct condensate produced by the evaporator coil to a water supply tank.

* * * * *